United States Patent [19]
Pride

[11] Patent Number: 5,807,053
[45] Date of Patent: Sep. 15, 1998

[54] MULTIPLE HAY BALE TRANSPORTER AND LOADER

[76] Inventor: Faron Pride, 406 W. Procter, Sturgeon, Mo. 65284

[21] Appl. No.: 623,015

[22] Filed: Mar. 28, 1996

[51] Int. Cl.⁶ .................................................. B66F 9/12
[52] U.S. Cl. .......................... 414/24.5; 414/917; 414/920
[58] Field of Search .................................. 414/24.5, 917, 414/920

[56] References Cited

U.S. PATENT DOCUMENTS

| | | |
|---|---|---|
| 3,393,768 | 7/1968 | Miller . |
| 3,934,726 | 1/1976 | Martin . |
| 3,967,742 | 7/1976 | Mcinert . |
| 4,264,252 | 4/1981 | Jennings et al. . |
| 4,306,825 | 12/1981 | Yilit . |
| 4,325,664 | 4/1982 | Chain et al. ........................... 414/24.5 |
| 4,411,571 | 10/1983 | Gildon . |
| 4,527,935 | 7/1985 | Fortenberry ........................... 414/24.5 |
| 4,537,549 | 8/1985 | Knels . |
| 5,129,775 | 7/1992 | Coats et al. . |
| 5,150,999 | 9/1992 | Dugan ...................................... 414/917 |
| 5,178,505 | 1/1993 | Smith ..................................... 414/24.5 |

FOREIGN PATENT DOCUMENTS

| | | |
|---|---|---|
| 2136392 | 9/1984 | United Kingdom . |
| 2158804 | 11/1985 | United Kingdom ................... 414/920 |
| 2204852 | 11/1988 | United Kingdom . |

*Primary Examiner*—Karen B. Merritt
*Assistant Examiner*—Gregory A. Morse
*Attorney, Agent, or Firm*—Dowell & Dowell

[57] ABSTRACT

An implement for use in simultaneously transporting multiple rolled forage bales which includes a frame having upper and lower portions with a first vertically movable bale engaging element mounted adjacent the upper portion of the frame and a lower bale engaging element mounted to the lower portion of the frame. The lower bale engaging element may be selectively removed from the frame to allow unrestricted elevating and loading or stacking of bales.

19 Claims, 4 Drawing Sheets

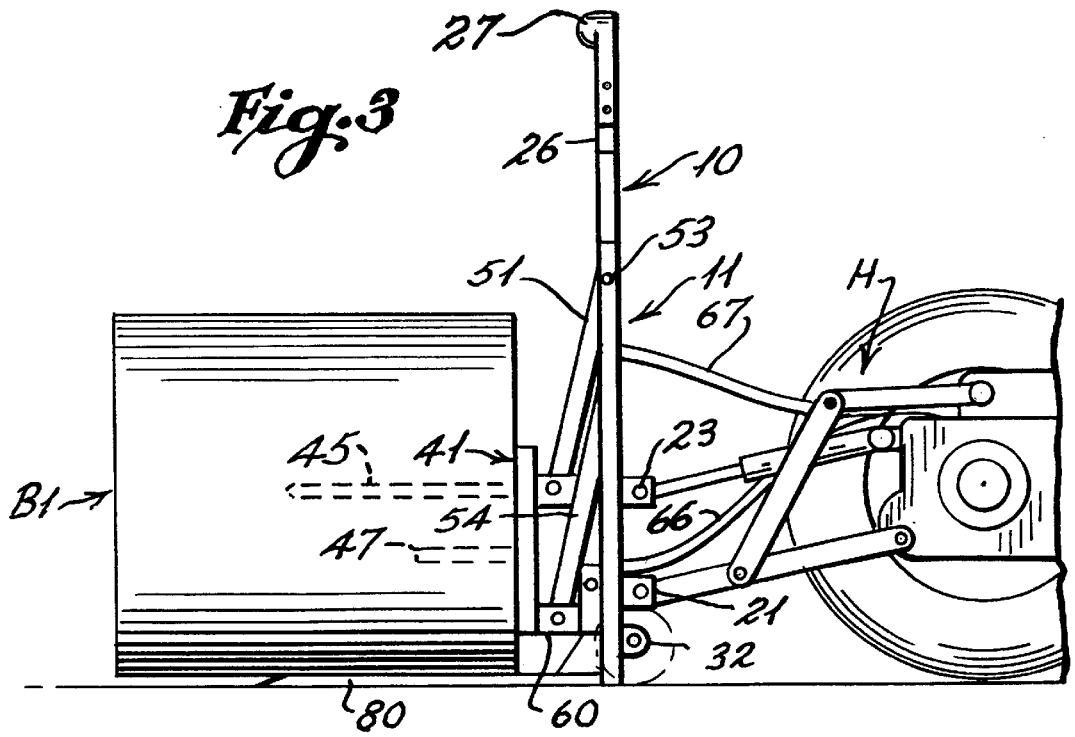
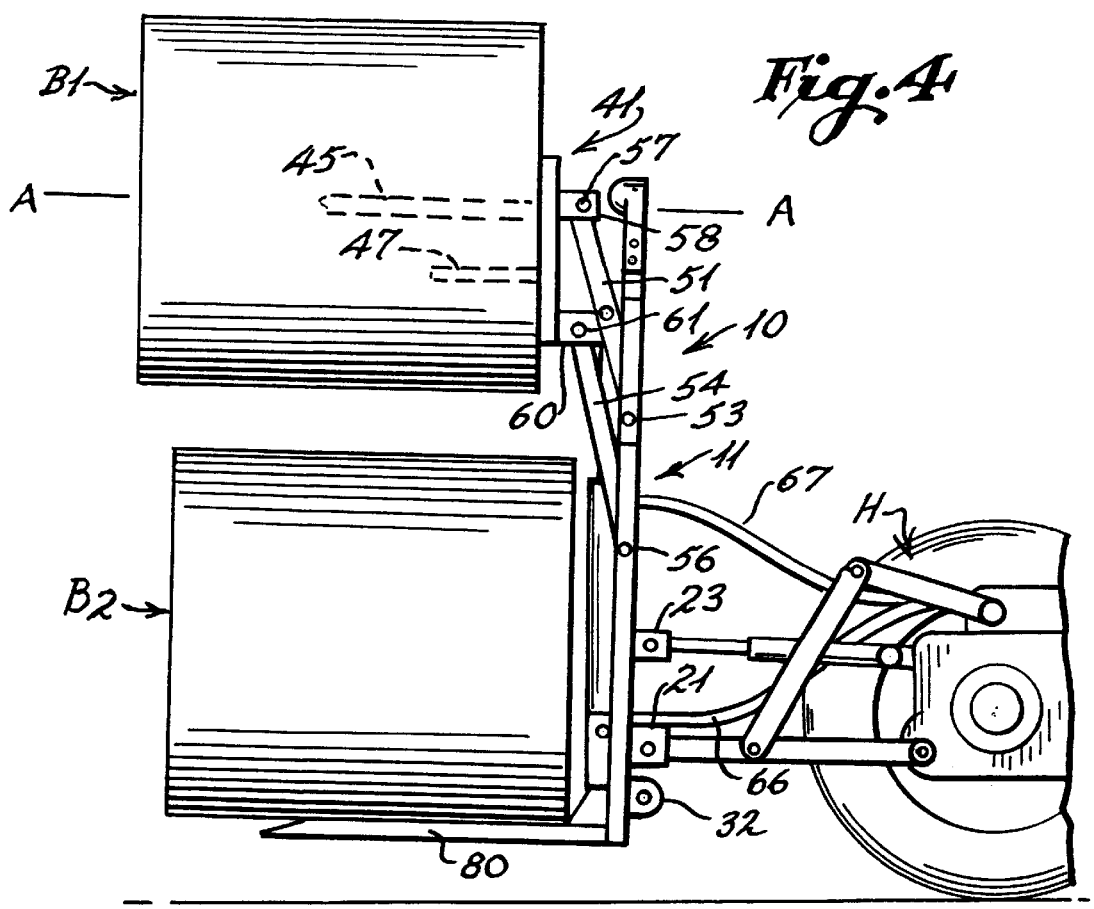

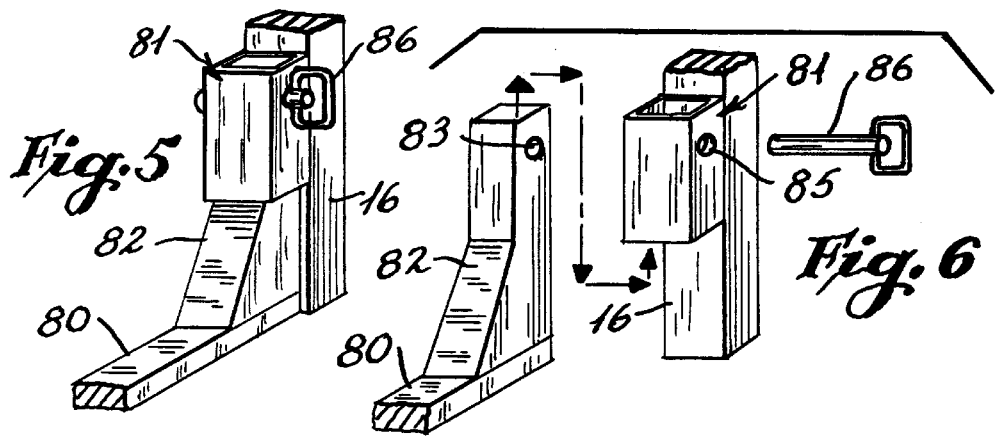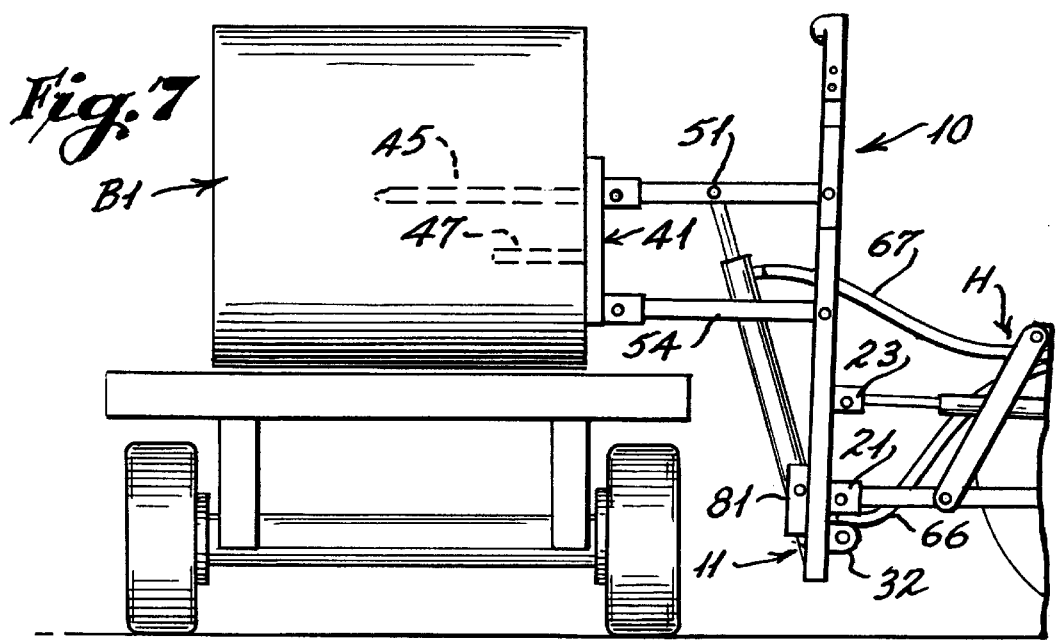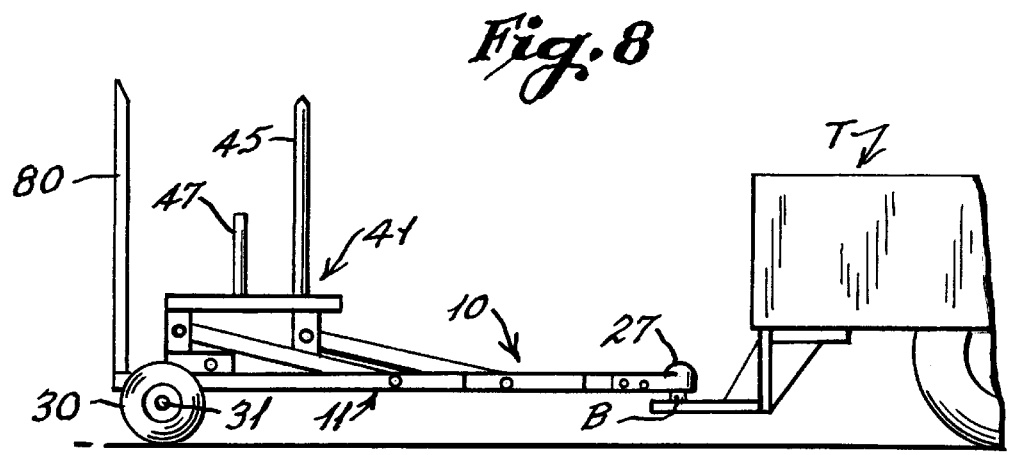

MULTIPLE HAY BALE TRANSPORTER AND LOADER

FIELD OF THE INVENTION

This invention is generally directed to implements for transporting and elevating rolled forage bales, such as hay bales, and more particularly to a bale transporter which can be used to transport two bales simultaneously. In the preferred embodiment, the implement is designed to be mounted to the conventional three point hitch of a tractor and includes a frame to which a bale elevating assembly is pivotally mounted and controlled by the operation of a cylinder connected to the hydraulic system of the tractor. The implement further includes a second bale engaging member which is removably mounted with respect to the frame and spaced below the bale elevating assembly.

HISTORY OF THE RELATED ART

It has become ever increasingly popular to harvest forage crops by rolling the cut and dried crops into large generally cylindrical bales. Depending upon different harvesting requirements, current baling equipment is used to form bales which may range in size from approximately four to five feet to eight feet in diameter. The bales may range in weight from approximately one thousand to several thousand pounds. Harvesting by rolling the bales is more commercially viable then the previous rectangular baling techniques in that the round bales may be formed and left in the field and exposed to the elements without destruction of the core material of the bales. The outer portion of the bales acts as a protective layer for the bulk of the material of each rolled bale. In addition, by forming the bales into larger configurations, there is reduction in the handling costs associated with harvesting. However, there are many instances when it is desired either to stack the formed bales in the field or to transport the bales to a storage or shipping area.

Conventionally, the bales are transported utilizing lifts which are mounted to the three point hitch of a tractor. Most transport devices are designed to lift and transport a single bale at a time. The movement of one bale at a time is labor intensive and many such single bale handlers are designed only to slightly elevate the bales for transporting and can not be utilized for purposes of elevating and stacking bales. This requires separate equipment for stacking bales in a storage area or elevating bales to the bed of a transport vehicle. Examples of such single bale carriers are disclosed in U.S. Pat. Nos. 3,934,726 to Martin and 3,967,742 to Meinert and United Kingdom Patent 2,136,392 to Udy.

To improve on the efficiency of handling formed bales of forage materials, and especially hay, implements have been designed for transporting more than a single bale at a time. In U.S. Pat. No. 4,306,825 to Yilit a bale handling apparatus is disclosed which is designed to be mounted to and controlled by the three point hitch of a tractor utilizing hydraulic cylinders which are connected to the hydraulic system of the tractor. The apparatus includes a pair of elongated tines which are separately engagable with two bales situated in side-by-side relationship. After the two bales are engaged, the bales are pivoted off the ground for transport. However, the handling apparatus is not designed to allow stacking of the bales and therefore separate equipment is required. Other examples of multiple hay bale carriers are disclosed in U.S. Pat. No. 4,537,549 to Knels and United Kingdom Patent 2,204,852 to Metcalfe.

To facilitate the elevating and stacking of rolled hay and other forage bales, other transport devices have been designed so as to engage a bale and slightly elevate the bale for transportation and thereafter further elevate the bale for stacking. These implements, however, are designed for transporting and stacking a single bale at a time. Such implements are disclosed in U.S. Pat. Nos. 4,264,252 to Jennings et al. and 5,129,775 to Coats et al.

In view of the foregoing, there remains a need to provide an implement which offers the utility of being able to transport more than a single bale at a time and still provide the utility of elevating the bales for stacking and loading purposes.

SUMMARY OF THE INVENTION

The present invention is directed to an implement for transporting and handling two rolled bales of forage matter, and particularly hay bales, wherein the implement includes a frame which is designed to be mounted to the three point hitch of a tractor. The frame includes an upper portion to which a bale elevating assembly is pivotably mounted and which assembly includes first bale engaging members. In the preferred embodiment, the bale elevating assembly includes a parallel linkage system which is connected to a hydraulic cylinder operated through the hydraulic system of the tractor. The parallel linkage system permits the first bale engaging members to be vertically elevated while being maintained in a generally horizontal relationship with respect to the ground. The frame also includes a lower portion to which second bale engaging elements are secured. In the preferred embodiment, the second bale engaging elements include a pair of forks which are removably mounted to the lower portion of the frame so that the forks may be disconnected from the frame to allow the implement to be utilized in close proximity to a loading area, such as the bed of a truck or a loading dock.

The implement is also designed to be towed by any conventional vehicle having a trailer hitch assembly thereby allowing the implement to be transported to and from a field without a tractor. In this respect, a separate trailer tongue is releasably mounted to the trailer frame for engagement with a conventional hitch. Further, a pair of wheels which are used to support the frame when being towed are also detachably mounted to the frame.

It is the primary object of the present invention to provide an implement for transporting and handling rolled bales of hay and other forage vegetation which allows two bales to be simultaneously transported with one bale being raised in an elevated relationship with respect to the other bale so as to provide a balanced load relative to the centerline of the transport vehicle, such as a conventional tractor.

It is another object of the present invention to provide an implement to be utilized to transport several bales of forage material at a time and which also has the capability of elevating the bales so as to facilitate the stacking and loading of the bales either for storage or transportation.

It is also an object of the present invention to provide a bale transport and handling implement which may be towed to a point of use by a conventional vehicle, such as a truck, and thereafter easily and quickly mounted for use in the field to the three point hitch of a tractor.

BRIEF DESCRIPTION OF THE DRAWINGS

A better understanding will be had of the invention with reference to the attached drawings wherein:

FIG. 3 is a left side illustrational view of the implement of FIG. 1 illustrating the manner in which a first rolled bale is engaged by the bale elevating assembly of the present invention;

FIG. 4 is a left side illustrational view showing two bales carried by the implement of the present invention;

FIG. 5 is an enlarged partial perspective view showing the manner in which one of the forks for supporting the lower bale, shown in FIG. 4, is secured to the lower portion of the frame of the implement of the present invention;

FIG. 6 shows the fork in FIG. 5 being removed from engagement with the frame of the implement of the present invention;

FIG. 7 is a left side illustrational view of the implement of the present invention illustrating the manner in which the bale elevating assembly is utilized to load or stack bales; and FIG. 8 is a right side illustrational view showing the implement of the present invention being towed behind a conventional vehicle, such as a truck.

DESCRIPTION OF THE PREFERRED EMBODIMENT

Figure 2:
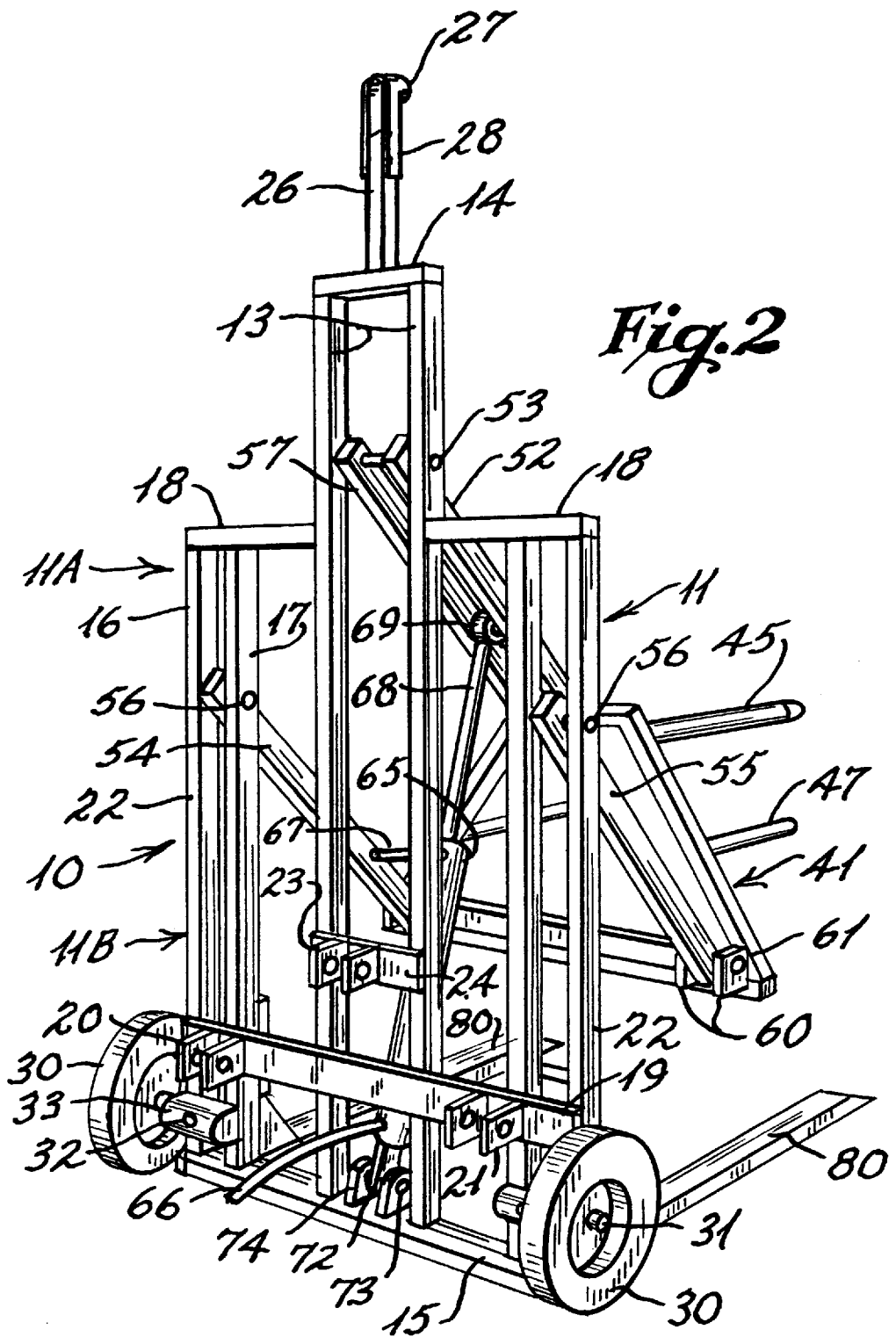
FIG. 2 is a rear perspective view of the bale transport and handling implement of the present invention.

With continued reference to the drawings, the bale transporting and handling implement 10 of the present invention includes a main frame 11 having upper and lower portions 11A and 11B and which is preferably formed of tubular or boxed beam steel elements. The main frame includes a central frame component 12 defined by a pair of elongated beams 13 which are joined at their upper or outer ends by a cross beam 14 and which are joined at their lower or inner ends by a base beam 15. The main frame also includes two pairs of outer longitudinal beams 16 and 17 which are joined at their outer end by cross beam segments 18 and which are joined at their inner ends to the base beam 15. The main frame, as shown in FIG. 2, is further reinforced by a transverse plate 19 which is secured in spaced relationship to the base beam 15 along the lower portion 11B of the frame. In order mount the implement to the three point hitch "H" of a tractor, a pair of spaced brackets 20 and 21 are secured to the plate 19 and extend from the rear surface 22 of the frame. A central mounting bracket 23 is mounted to a plate 24 which is welded or otherwise secured along the longitudinal beams 13 in space relationship from the brackets 20 and 21. Each of the brackets 20, 21 and 23 have aligned openings therein for purposes of receiving locking pins for securing the brackets to the three point hitch "H" of a tractor, as is shown in FIGS. 3 and 4.

The implement 10 is specifically designed to be towable behind a conventional vehicle, such as a truck "T", as shown in FIG. 8. A hitch tongue 26 is welded or otherwise fixed to the cross beam 14 and extends outwardly therefrom. A conventional hitch socket 27 is removably mounted by pins or bolts 28 to the tongue 26. Wheels 30 are rotatably mounted on stub shafts 31 which are removably mounted in hollow sleeves 32 welded adjacent the base beam 15 on either side of the frame. The stub shafts 31 may be locked in place by suitable locking pins 33 which extend through aligned openings in the sleeves 32 and the stub shafts 31.

The hitch socket 27 and the wheels 30 allow the implement to be transported by connecting the hitch 27 to a conventional ball hitch "B" of the vehicle "T". This allows the implement to be easily transported over highways from a storage area to a point of use without requiring that the implement be conveyed by a tractor. Once in the field, the wheels and tongue may be removed after the frame 11 has been mounted to the three point hitch "H" of the tractor.

The implement 10 is specifically designed to allow for transporting and handling of two round hay or other forage bales at a single time, such as shown at B1 and B2 in FIG. 4. The implement is further designed so that the weight of the bales is centralized with respect to the center axis or centerline of the vehicle so that the weight of the bales is equally distributed on each side of the vehicle. This permits a more uniform distribution to the vehicle which prevents any tilting of the vehicle which might otherwise be caused by the weight of the bales if the bales were being conveyed in a side-by-side relationship.

The implement includes a bale elevating assembly 40 which extends from the front surface 22' of the frame having a stabilizing frame 41 with side beam elements 42 and upper and lower cross brace elements 43 which are reinforced by a center post 44. A primary bale engaging rod 45 is welded to the upper portion of the post 44 and is reinforced by a pair of spaced flanges 46 which are welded between the base of the rod and the post. A pair of supplemental stabilizing rods 47 are secured so as to extend outwardly from the frame 41.

The stabilizing frame 41 is vertically movable with respect to the frame 11 by a double parallel linkage 50 which includes a pair of upper linkage members 51 and 52 which are pivotably mounted about a pivot pin 53 to the upper portion of the frame between the longitudinal beams 13 and a pair of lower linkage members 54 and 55 which are pivotably mounted about their inner ends to pivot pins 56 which are mounted between the outside pairs of longitudinal beams 16 and 17 generally centrally of the frame. The outer ends of the parallel linkages 51 and 52 are pivotably mounted to pivot pins 57 extending between a pair of spaced brackets 58 which are welded or otherwise secured to the rear surface of the stabilizing frame 41 adjacent the upper cross brace 43. The outer ends of the lower parallel linkages 54 and 55 are each pivotably mounted between a pair of spaced brackets 60 by way of separate pivot pins 61 with each pair of brackets being mounted adjacent the opposite outer portions of the lower cross brace 43. The parallel linkage allows the stabilizing frame 41 to be pivoted upward in a vertical direction, as is shown in FIGS. 3 and 4, while maintaining the bale engaging rods and auxiliary rods 45 and 47 in a generally horizontal orientation so that a bale B1 engaged by the rods will not slip from engagement therewith. The primary rod 45 is designed to be inserted generally centrally of a bale along the elongated axis A—A thereof. The supplemental rods 47 act to stabilize and prevent any rotational shifting of the bale and engage the bale at a point spaced below the primary rod 45, as is shown in FIG. 3.

The elevating assembly 40 is raised utilizing a hydraulic cylinder or other lifting member 65 which is connected by way of hydraulic lines 66 and 67 to the tractors hydraulic system. As opposed to utilizing a pair of hydraulic lines, the present invention may be utilized with a single acting cylinder utilizing the weight of the frame to retract the piston rod 68 to lower the elevating assembly. The piston rod is pivotably connected at its outer end 69 to a pivot pin 70 mounted between and generally centrally of the upper parallel links 51 and 52. The hydraulic cylinder 65 is connected adjacent its base 72 about pivot pin 73 to a pair of spaced brackets 74 welded to the base beam 15.

After a first bale B1 has been engaged by the rods 45 and 47 and rested against the stabilizing frame 41, the bale is elevated to the position shown in FIG. 4. Thereafter, a pair of forks 80 which are mounted within housings 81 are used to support a second bale B2. The housings 80 are secured to the lower portion of the frame and an on opposite sides thereof. As shown in FIG. 4, bale B2 is designed to rest on the upper surface of the forks. The two bales may then be elevated by raising the three point hitch "H" of the tractor slightly off the ground to permit transport of both bales, simultaneously.

The forks 80 include base portions 82 which extend generally perpendicularly with respect to the primary body of the forks. The base portions 82 include an opening 83 therethrough. The housings 81 also include openings 85 therethrough which are aligned with the openings 83 when the base portions 82 are inserted within the housings. Locking pins 86 are insertable through the aligned openings to retain the forks 80 within the housings 81. In this manner, the forks may be easily released from engagement from the frame 11 by removing the pins 86 and raising the frame 11 so that the base portion 82 of the forks is released from the housings 81. This allows the implement to be utilized without the forks extending forwardly of the frame. This is necessary when the implement is to be utilized where there may be an obstruction with the forks, such as a bed of a truck, as shown in FIG. 7. Other instances would be where the forks 80 may interfere with the wall of a loading dock or other storage area. With the forks removed from the frame, the implement may be brought into close proximity with a vehicle so that the bales B1 and B2 can be elevated and thereafter loaded on the bed of a truck, as is shown in FIG. 7. Similarly, the implement may be utilized to singularly elevate and stack bales in a storage area. Thereafter, the forks may be reinserted within the housings 81 and locked into place for transporting of additional bales.

It should be noted that although a single hydraulic cylinder is shown for use in raising the elevating assembly of the present invention, two cylinders may also be utilized. Further, the cylinders may be reversely mounted so that the extension rod is mounted to the base beam 15 as opposed to the parallel linkage assembly.

Figure 1:
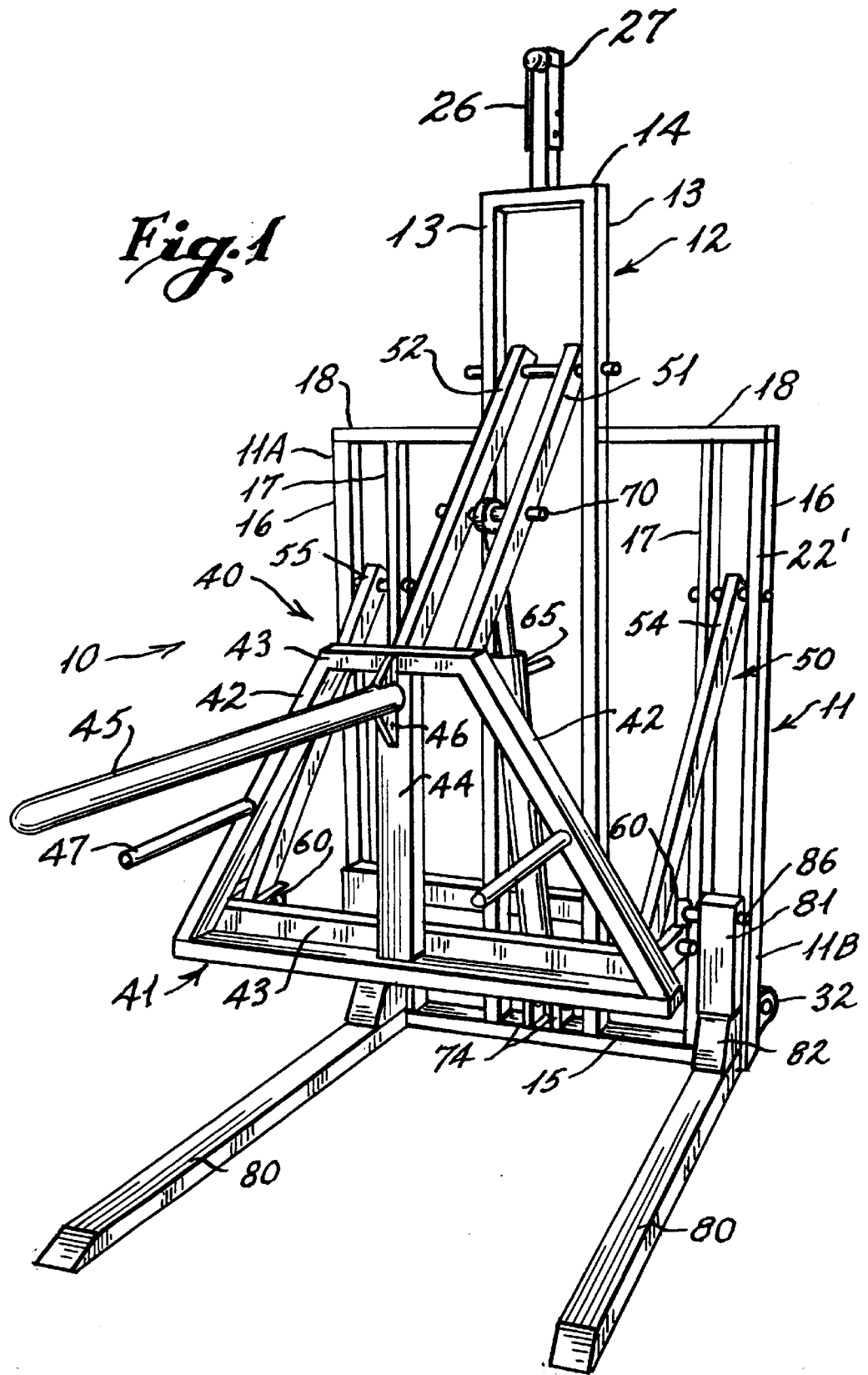
FIG. 1 is a front perspective view of the bale transport and handling implement of the present invention.

In use, the implement is towed to a field by a vehicle, such as a truck "T". Thereafter, the implement is released from the hitch mechanism of the truck and pivoted to an upright position, as is shown in FIG. 2. Thereafter, the implement may be connected utilizing the mounting brackets 20, 21 and 23 to the three point hitch "H" of a tractor. The implement may thereafter be slightly elevated and the wheels 30 and stub shafts 31 removed from the mounting sleeves 32 which are secured to the frame. The implement is then ready for use, as is shown in FIG. 1.

The implement is initially utilized to lift a first bale B1 by engaging the rods 45 and 47 in the bales, as shown in FIG. 3 with the bale engaged against the stabilizing frame 41. Thereafter, the hydraulic cylinder is activated so as to raise the bale B1 by pivoting the parallel linkage assembly upwardly, as shown in FIG. 2. Thereafter, the forks 80 are engaged at the base of a second bale B2 and the entire implement raised off the ground, as is shown in FIG. 4.

After being transported to a loading or stacking area, the implement is lowered to the ground and the locking pins 86 are released to allow the forks 80 to be removed from the frame 11. The implement is thereafter raised to disengage the forks 80. The tractor may then be manipulated so as to load the upper bale B1 either onto a vehicle or into a stacking area. Thereafter, the elevating assembly is lowered to a position, such as shown in FIG. 3, to engage the second bale B2 so that the second bale may be elevated and placed on the transport vehicle or stacked within a storage area. Thereafter, the forks 80 may be re-engaged within the housings 81 and the implement is ready for transporting additional bales.

I claim:

1. An implement for use with a three point hitch of a tractor for transporting multiple forage bales comprising:
    a frame having upper and lower portions and front and rear surfaces;
    mounting means for securing said frame to the three point hitch of the tractor;
    a first bale engaging means;
    a first bale elevating means, first pivot means for pivotably mounting said first bale elevating means to said first bale engaging means and second pivot means for pivotably connecting said first bale elevating means to said frame so as to extend outwardly from said front surface of said frame;
    a second bale engaging means mounted to said frame adjacent said lower portion thereof and extending outwardly from said front surface of said frame;
    a lift means mounted to said frame and said first bale elevating means for selectively raising said first bale engaging means from a lower position adjacent said lower portion of said frame and substantially overlying said second bale engaging means to an upper position adjacent said upper portion of said frame so as to be substantially overlying said second bale engaging means;
    whereby a first bale may be engaged by said first bale engaging means in close proximity to said lower portion thereof and thereafter elevated relative to said frame after which a second bale may be engaged by said second bale engaging means.

2. The implement of claim 1 in which said first bale elevating means includes a double parallel linkage assembly having a first pair of upper parallel linkage members and a second pair of lower parallel linkage members, and said first and second pair of linkage members being parallel to one another.

3. The implement of claim 2 wherein said lift means includes a hydraulic cylinder having one end pivotably mounted to said double parallel linkage assembly.

4. The implement of claim 3 wherein said second bale engaging means includes a pair of elongated forks mounted to said lower portion of said frame.

5. The implement of claim 4 including mounting means for releasably securing said forks to said frame.

6. The implement of claim 5 in which said mounting means includes a pair of hollow sleeves mounted to said lower portion of said frame, said forks having inner end portions which extend generally parallel to said front surface of said frame and which are slidably receivable within said sleeves, and pin means for selectively retaining said inner end portions of said forks within said sleeves.

7. The implement of claim 5 wherein said frame includes a pair of generally parallel central beam members positioned intermediate two pair of outer generally parallel side beam members, said first pair of upper parallel linkage members being pivotably mounted to said central beam members and said second pair of lower parallel linkage members being pivotably mounted to said two pair of side beam members.

8. The implement of claim 2 wherein said first bale engaging means includes an upright stabilizing frame having upper and lower and spaced side members, and at least one elongated rod extending outwardly generally perpendicularly from said stabilizing frame.

9. The implement of claim 8 including secondary rods extending outwardly from said stabilizing frame in spaced relationship to said at least one elongated rod.

10. The implement of claim 9 wherein said lift means includes at least one hydraulic cylinder and means for pivotably mounting one end of said at least one hydraulic cylinder to said first pair of upper parallel linkage members.

11. The implement of claim 1 including vertically extending sleeve means mounted to said lower portion of said frame for releasably securing said second bale engaging means to said frame.

12. The implement of claim 11 including wheel assemblies, and means for mounting said wheel assemblies to said frame so as to extend from said rear surfaces thereof.

13. The implement of claim 1 including a pair of wheel assemblies and means for releasably mounting said wheel assemblies to said frame.

14. The implement of claim 13 including a hitch tongue and means for releasably mounting said hitch tongue to said upper portion of said frame.

15. An implement for use with a three point hitch of a vehicle for transporting and lifting multiple forage bales, comprising:

a vertically extending frame having upper and lower portions and including mounting means to secure said frame to the three point hitch whereby said frame may be vertically elevated utilizing the three point hitch;

a first bale engaging means including at least one rod extending generally perpendicularly with respect to said frame;

a second bale engaging means including a pair of forks mounted to and extending generally perpendicularly with respect to said lower portion of said frame;

a linkage assembly including a plurality of linkage members pivotally connected at outer ends to said first bale engaging means and pivotally connected at inner ends to said frame;

lifting means having a first end engageable with said linkage means and a second end connected to said frame, said lifting means and said linkage means being configured so as to retain said at least one rod of said first bale engaging means generally perpendicular with respect to said forks of said second bale engaging means as said first bale engaging means is moved from a lower position adjacent to and overlying said forks to an upper position adjacent to said upper portion of said frame and overlying said forks;

whereby a first bale may be engaged by said first bale engaging means and elevated relative to said frame after which a second bale may be engaged by said second bale engaging means.

16. The implement of claim 15 in which said first bale engaging means includes a frame having upper and lower and side members, said linkage means including a double parallel linkage assembly having a first pair of upper generally parallel linkage members pivotably mounted at their inner ends adjacent said upper portion of the frame and pivotably mounted at their outer ends to the upper portion of the frame of said first bale engaging means and a second pair of generally parallel linkage members pivotably mounted at their inner ends to said frame below said first pair of parallel linkage members and pivotably mounted at their outer ends to said frame of said first bale engaging means spaced below said first pair of linkage members.

17. The implement of claim 16 in which said forks are generally L-shaped in configuration, sleeves extending generally parallel to said frame mounted to said lower portion of said frame for receiving a portion of said L-shaped forks, and means for releasably securing said forks within said sleeves.

18. The implement of claim 17 including a pair of wheel assemblies mounted to said frame adjacent said lower portion thereof, and a trailer hitch tongue extending from said upper portion of said frame whereby the implement may be towed with said frame being pivoted about said wheel assemblies to a general horizontal orientation.

19. The implement of claim 15 wherein said forks include upper surfaces, said forks being spaced relative to one another so as to be adapted to support a second bale on said upper surface of said forks.

* * * * *